United States Patent [19]

Bukhtiyarov et al.

[11] 4,326,410
[45] Apr. 27, 1982

[54] ENGINE TEST METHOD

[76] Inventors: Ivan D. Bukhtiyarov, Novosibirsky raion, rabochy poselok Krasnoobsk, 3, kv. 137; Viktor B. An, Novosibirsky raion, rabochy poselok Krasnoobsk, 3, kv. 5, both of Novosibirskaya oblast; Marat N. Farshatov, ulitsa S. Razina, 46, kv. 20, Kuibyshevskaya oblast, Tolyatti; Fedor F. Sapozhnikov, ulitsa Sverdlova, 187, kv. 211, Kuibyshevskaya oblast, Tolyatti; Anatoly G. Sidorov, ulitsa Revoljutsionnaya, 125, kv. 16, Kuibyshevskaya oblast, Tolyatti; Natalya A. Proskurina, bulvar Kulibina, 9, kv. 12, Kuibyshevskaya oblast, Tolyatti; Vladimir I. Marakin, Novosibirsky raion, rabochy poselok Krasnoobsk, 7, kv. 165, Novosibirskaya oblast, all of U.S.S.R.

[21] Appl. No.: 156,203

[22] Filed: Jun. 3, 1980

[51] Int. Cl.³ .......................................... G01M 15/00
[52] U.S. Cl. .................................................. 73/117.3
[58] Field of Search ................ 73/116, 117.3; 364/551

[56] References Cited

U.S. PATENT DOCUMENTS 3,695,099 10/1972 Viano ................................ 73/117.3

FOREIGN PATENT DOCUMENTS 2812545 10/1979 Fed. Rep. of Germany ........ 73/116

*Primary Examiner*—Jerry W. Myracle
*Attorney, Agent, or Firm*—McAulay, Fields, Fisher, Goldstein & Nissen

[57] ABSTRACT

There is provided an engine test method whereby the engine involved is started and the systems thereof are regulated so as to obtain steady running, whereupon, by controlling fuel feed, a running-in process is performed by repeatedly carrying out runup-rundown cycles. In every running-in cycle, beginning with the first one, at least one of the parameters, for example, the acceleration of rundown, is measured and analyzed for the purpose of assessing the technical condition of the engine on which basis the parameters of the next running-in cycle are selected, the running-in process being ended at the instant when the engine reaches the predetermined technical condition.

5 Claims, 4 Drawing Figures

ENGINE TEST METHOD

The present invention relates to test engineering and has particular reference to methods of testing engines, for example, internal combustion engines.

The invention can be used to advantage in the automotive industry for the purpose of testing bearings, gears, gearboxes, and whole engines.

At present intensive development of the automotive industry, essentially the engine building branch thereof, takes place in all countries. Before an engine is put into operation, it should be tested. The quality of testing largely determines the dependability and life of the engine involved.

To test newly assembled and repaired engines and units thereof, it is necessary to have cheap and highly efficient methods and means whereby a high degree of wearing-in can be obtained.

Known in the art are various methods of testing (see I. B. Gurvich, "Running-in of Automobile Engines", NAMI, pages 10–15, published in 1957 in Russian) which include cranking by external power and running-in under the engine's own power at various predetermined rotational speeds.

These methods suffer from the disadvantage that they require an external source of cranking power of 30 to 100 kW and power absorption equipment capable of absorbing up to 100 percent of the engine power output. Furthermore, the running-in conditions fail to cover all the speed and load conditions of engine operation in actual service.

Another disadvantage of these methods is that they do not provide a criterion of the extent of the wearing-in acquired by the engine involved.

Known in the art is another method of engine testing (see, for example, U.S.S.R. Inventor's Certificate No. 337682, class F02B 79/00) whereby the engine crankshaft is rotated by an external power and electric current is passed through the mating parts. The running-in is discontinued at the instant of stabilization.

This method suffers from the disadvantage that it requires an external source of power and that the judgement of the extent of engine wearing-in is substantially erroneous inasmuch as the value of electric current varies with oil temperature because the latter affects linear expansion of the mating parts and, consequently, the parts contact areas through which current is passed.

Also known in the art is an engine test method (see, for example, I. B. Gurvich, "Running-in of Automobile Engines", pages 58–59, published in 1957 in Russian) whereby the engine involved is run in under no load, the crankshaft speed being gradually increased to a predetermined limit within a predetermined period. This method suffers from the disadvantage that engine running-in is performed under no load which results in a slow wearing-in of mating parts.

Another disadvantage is that the running-in conditions fail to correspond to engine operating conditions in actual service.

Still another disadvantage of this method is that it does not provide a criterion of the extent of the wearing-in acquired by the engine involved.

Also known in the art is the engine test method used by us as a background which consists essentially in that the engine being run in is loaded by its own moments of inertia and resistance forces by virtue of repeatedly carrying out runup-rundown cycles according to a predetermined programme. The running-in process is ended when the predetermined time of the runup-rundown cycle has elapsed and the predetermined amount of fuel has been consumed.

This method suffers substantially from the disadvantage that the running-in process is carried out without considering the technical condition of the engine involved, for example, mechanical power losses in the engine, unequal performance of the cylinders, noise and vibration level, oil pressure, etc.

It will be noted that mechanical power losses in engines of the same type vary approximately 25 percent in the case of newly assembled engines and still more in the case of repaired engines. Furthermore, the technical condition of engines changes widely during the process of running-in. Consequently, running in engines without considering their technical condition may result in excessively intense wearing-in which causes unwanted wear, scoring and seizure, or, conversely, insufficient intensity of wearing-in may necessitate a longer running-in period.

It will also be noted that, as a rule, the time assigned for running-in is limited and, therefore, insufficient intensity of wearing-in may result in incomplete running-in.

Incompletely run in engines are susceptible to shortening of life as compared with that guaranteed by the manufacturer.

Another disadvantage of this method is that the judgement of the extent of wearing-in from the duration of the runup-rundown cycle and the amount of fuel consumed is substantially erroneous due to instability of the working process, differences in the performance of the fuel system and in the rate of fuel feed by the actuating mechanism, instability of performance of the ignition system, etc. Eventually, erroneous determination of the extent of wearing-in has an adverse effect on both the quality of engine running-in and the duration of the running-in process.

It is an object of the present invention to optimize engine running-in conditions.

It is a further object of the present invention to provide an engine test method whereby engine running-in conditions can be optimized in such a manner as to perform a running-in process rendering maximum intensity of wearing-in of mating parts without excessive wear, scoring and seizure by continuously monitoring the technical condition of the engine being run in and correcting the running-in parameters.

These objects are achieved in an engine test method whereby the engine involved is started and the systems thereof are regulated so as to obtain steady running, whereupon, by controlling fuel feed, a running-in process is performed by repeatedly carrying out runup-rundown cycles, according to the invention, in every running-in cycle, beginning with the first one, at least one of the parameters, for example, the acceleration of rundown, is measured and analyzed for the purpose of assessing the technical condition of the engine on which basis the parameters of the next running-in cycle are selected, the running-in process being ended at the instant when the engine reaches the predetermined technical condition.

The method of the present invention makes it possible to continuously monitor variation in the current technical condition of the engine both at the commencement of the running-in and during the process thereof and to automatically determine and select optimum running-in parameters.

The knowledge of the engine technical condition permits determining the extent of the wearing-in acquired by the engine and ending the running-in process at the proper point in accordance with the predetermined running-in criterion.

On the whole, we may say that the knowledge of engine technical condition in the process of running-in enables both the parameters and duration of the running-in process to be optimized which results in reduced time spent for, and in better quality of wearing-in of the mating parts.

For a further understanding of the invention, an embodiment thereof will be described in detail with reference to the accompanying drawings in which.

Figure 1:
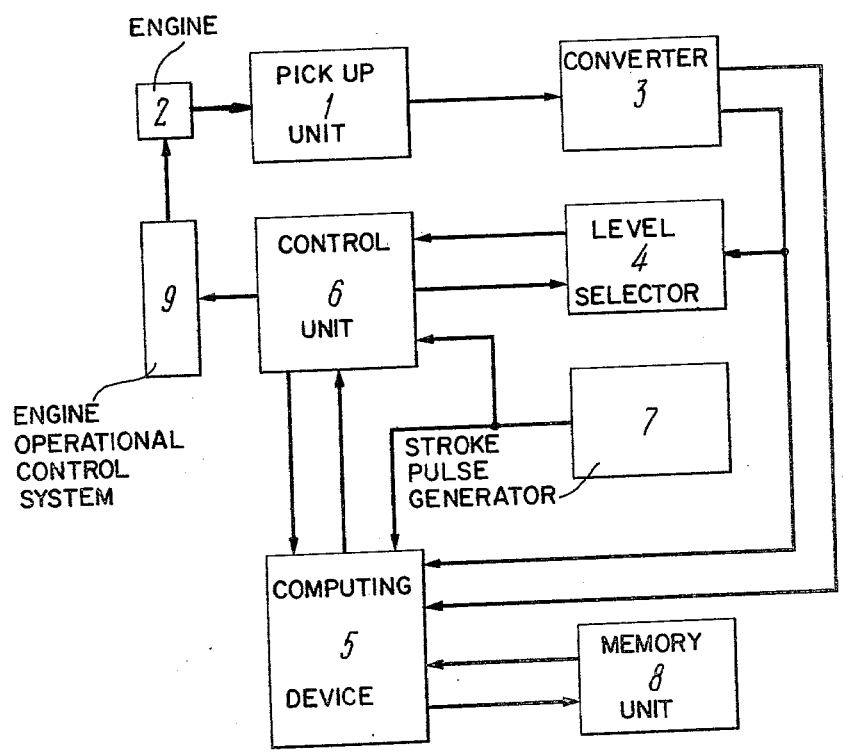
FIG. 1 is a block diagram of an apparatus for carrying the engine test method into effect.

For a still further understanding of the invention, consideration will now be made of the physical essence of the dynamics of engine operation during a transient process.

In differential form, the equation of turning moments of an internal combustion engine is:

$$\tau \cdot (dw/dt) = \mu_i - \mu_1 = \mu_2. \qquad (1)$$

where
$\tau$ = Corrected inertia moment of the engine.
$dw/dt$ = Accelertion of the engine crankshaft.
$\mu_i$ = Indicated engine torque.
$\mu_1$ = Torque due to engine internal power losses.
$\mu_2$ = Effective engine torque.

Referring to equation (1), the greater the acceleration $dw/dt$ of engine runup, the greater the self-loading of the engine. Hence, the maximum torque corresponds with the maximum runup acceleration $dw/dt$.

It is known that the mating parts wear in more intensely when the engine operates under load.

The runup acceleration $dw/dt$ and, consequently, engine load can be varied by changing the opening of the engine throttle. Having in mind the initial technical condition of newly assembled engines, running-in must not be carried out under the maximum load, i.e. at the maximum acceleration $dw/dt$, from the very beginning of the process. Therefore, the present invention consists essentially in the following:

measuring a set of parameters, for example, rundown acceleration, noise and vibration level, temperature, etc., analyzing the measurements of the parameters and determining the technical condition of the engine concerned.

Determining running-in parameters on the basis of the obtained information on the engine technical condition.

According to the invention, the following data are recommended for use as running-in parameters:
the lower limit of the engine rotational speed from which engine runup is commenced,
the upper limit of the engine rotational speed from which engine rundown is commenced,
runup acceleration.

According to the invention, the running-in process is carried out as follows:

The engine is started and its systems are regulated so as to obtain steady running at the minimum idle speed $n_{11}$.

Then the running-in system is put in operation, its actuating mechanism increases fuel feed and the engine gains speed. When the engine reaches the preset speed $n_{21}$, the ignition is switched off and the engine runs down.

During the runup and rundown of the 1st running-in cycle, measurements of a set of parameters, for example, rundown acceleration $a_{22}$, temperature $t_2$ °C., etc. are taken continuously. Then these measurements are analyzed and selection is made of the parameters of the 2nd running-in cycle, viz: the lower speed limit $n_{12}$, the upper speed limit $n_{22}$ and runup acceleration $a_{12}$.

The 2nd running-in cycle is commenced just when the engine slows down to the speed $n_{12}$ during the rundown in the 1st running-in cycle. At this point the ignition is switched on and the engine runs up with the acceleration $a_{12}$. When the engine speed reaches the upper speed limit $n_{22}$, the ignition is switched off and the engine runs down.

During the runup and rundown of the 2nd or any $j$'th running-in cycle measurements are likewise taken in order to determine the parameters of the next cycles, viz: $n_{13}$, $n_{23}$, $a_{13}$ and $n_{1j}$, $n_{2j}$, $a_{2j}$.

The following criteria are recommended for determining the end of the running-in process:

Criterion One

Difference in at least one of the parameters, for example, rundown acceleration at the commencement of running-in and during the process thereof, reaches the preset value.

Criterion Two

Percentage of variation in at least one of the parameters, for example, rundown acceleration in the process of running it in relation to the initial value thereof, reaches the preset value.

Criterion Three

The rate of variation in at least one of the parameters, for example, rundown acceleration reaches the preset value.

Criterion One indicates that the engine is to be run in until at least one of the parameters, for example, mechanical power losses, varies by the preset value.

Criterion Two indicates that the engine is to be run in until at least one of the parameters, for example, mechanical power losses in the process of running-in, varies to the preset extent in relation to the mechanical power losses at the commencement of running-in.

Criterion Three indicates that the engine is to be run in until the preset stabilization of wearing-in is acquired, this being determined by at least one of the parameters, for example, rate of variation in the mechanical power losses in the process of running-in.

In the embodiment of the invention described herein the parameters of the engine running-in cycles are determined and selected on the basis of the engine technical condition assessed merely by rundown acceleration (mechanical power losses) and oil temperature.

The quality of the running-in process should provide for the engine to normally operate after the running-in throughout the operating range:

at rotational speeds from 750 to 6,000 rpm,
with runup acceleration up to 80 rev/sec$^2$,
at engine temperature up to 90° C.

Referring to the block diagram in FIG. 1, the apparatus for carrying the invention into effect comprises a pickup unit 1 connected to the engine 2 being tested. The output of the pickup unit 1 is connected with the input of a converter 3. The first output of the converter 3 is connected with the first input of a level selector 4 and with the first input of a computing device 5. The second output of the converter 3 is connected with the second input of the computing device 5.

The output of the level selector 4 is connected with the first input of a control unit 6 whose second input is connected with a stroke pulse generator 7. The third input of the computing device 5 is also connected with the stroke pulse generator 7, whereas the fourth and fifth inputs of the computing device 5 are connected respectively with a memory unit 8 and the first output of the control unit 6. One of the outputs of the computing device 5 is connected with the memory unit 8 and another output of the computing device 5 is connected with the second input of the control unit 6 whose second output is connected with the input of an engine operational control system 9 and the input of the system 9 is connected with the engine 2.

Besides the third output of the control unit 6 is connected with the second input of the level selector 4.

Figure 2:
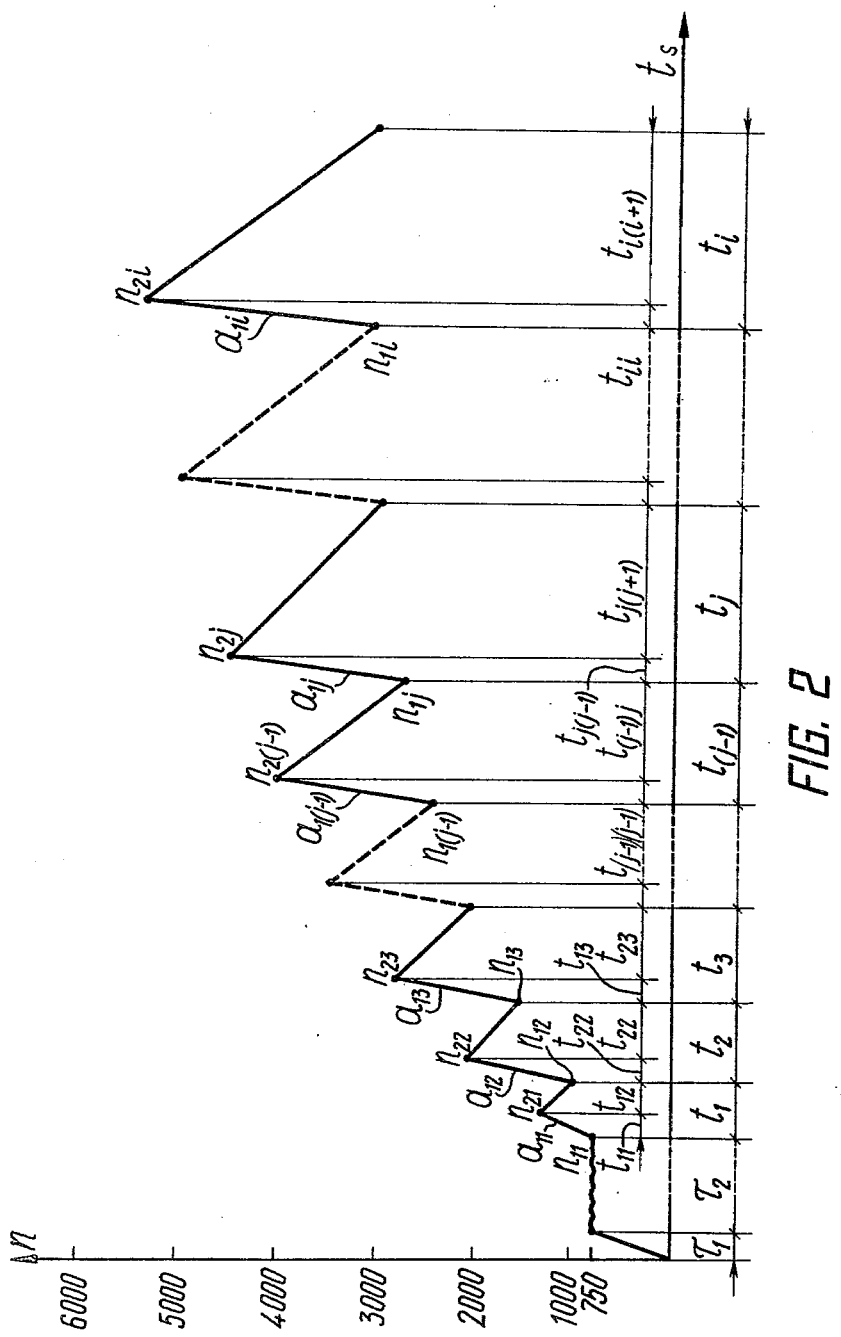
FIG. 2 is a diagram explaining the running-in principle.

According to the invention, running-in of engines is performed as follows:

The engine 2 (FIG. 1), mounted on a stand, is started for the period $\tau_1$ (FIG. 2) by means of the starting system and the engine systems are regulated for the period $\tau_2$ so as to obtain steady running at the preset lower speed limit $n_{11}$ (FIG. 2) of the order of 750 rpm. Thereafter the running-in system is put in operation at which instant the first running-in cycle $t_1$ commences automatically. During this cycle the engine operational control system 9 (FIG. 1) increases fuel feed and the engine 2 speeds up for runup period $t_{11}$ (FIG. 2).

When the preset upper speed limit $n_{21}$ is reached, the ignition is switched off and the engine slows down for the rundown period $t_{12}$.

The rotational speed pickup and the temperature pickup incorporated in the pickup unit 1 (FIG. 1) send signals to the converter unit 3 which sends pulses, whose frequency is proportional to the engine rotational speed and the oil temperature, to the level selector 4 and the computing device 5 respectively. When the engine reaches the preset rotational speed during the rundown in the first running-in cycle, a signal from the level selector 4 goes via the control unit 6 to bring into action the computing device 5 which determines the value of the rundown acceleration $a_{21}$ (FIG. 2) and the oil temperature $t_{12}$ °C.

Experiments have shown that the parameters $n_{12}$, $n_{22}$ and $a_{22}$ (FIG. 2) of the second running-in cycle $t_2$, depending on the engine technical condition judged by the mechanical power losses $N_{12}=K_1 \cdot a_{12}$ and the oil temperature $t_1$ °C. at which the mating parts are most intensely worn in without excessive engine wear, scoring and seizure, should be found from the expressions:

$$n_{12} = K_2(l - N_{12}) \\ n_{22} = K_3(l - N_{12}) \\ a_{12} = K_4(l - N_{12}),$$ (2)

where $K_2, K_3, K_4$ = Coefficients used depending on the engine oil temperature.
$p$ = Coefficient used depending on the type of the engine being run in.
$a_{12}$ = Acceleration of the engine being run in.

For one of the engine types whose coefficient $l=45$, at a temperature of 40° C. at the commencement of running-in the following coefficients K apply:

$$K_2 = 40, K_3 = 60, K_4 = 1.$$

Thus, the computing device 5 determines the parameters of the second running-in cycle by the expressions:

$$n_{12} = 40(45 - N_{12}) \\ n_{22} = 60(45 - N_{12}) \\ a_{12} = 1(45 - N_{12})$$ (3)

When the engine speed reaches the lower limit $n_{12}$, the ignition is switched on and the engine runs up with the acceleration $a_{12}$. When the engine speed reaches the upper limit $n_{21}$, the ignition is switched off.

Consequently, the parameters $n_{12}$, $n_{22}$ and $a_{12}$ of the second running-in cycle can be taken as corresponding to the initial technical condition of the engine.

The parameters of the i'th running-in cycle, which correspond to the final technical condition of the engine in the running-in process can be chosen with respect to the engine operational data in actual service, i.e.:

$$n_{2i} = 6000 \text{ rpm} \\ n_{1i} = 3000 \text{ rpm} \\ a_{1i} = 80 \text{ rev/sec}^2$$ (4)

Figure 3:
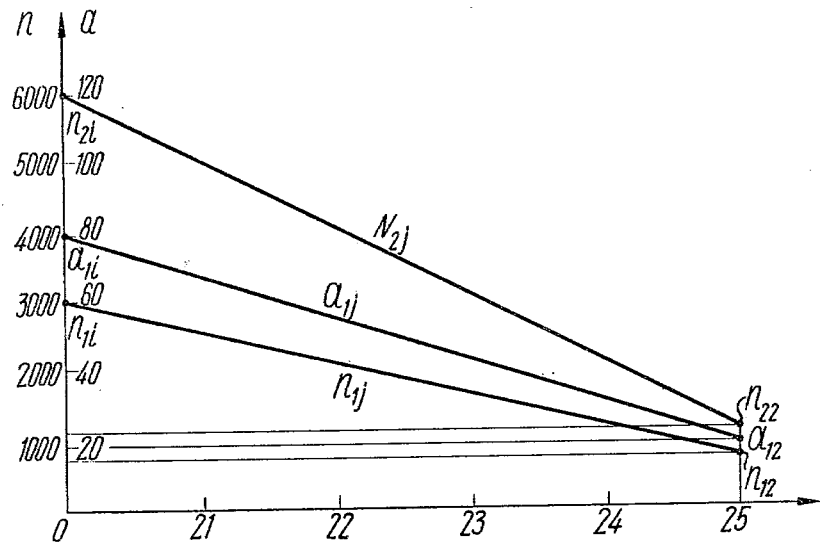
FIG. 3 is a graph depicting variation of the running-in parameters with the acceleration of rundown.

Having in mind that the parameters of the running-in cycles vary in proportion to variation of the engine technical condition and knowing the running-in parameters $n_{12}$, $n_{22}$ and $a_{12}$ corresponding to the initial technical condition of the engine and the parameters $n_{2i}$, $n_{1i}$ and $a_{1i}$ correponding to the final technical condition of the engine, we can determine the parameters of any intermediate l'th running-in cycle in the form of an equation of straight lines passing through two points, viz: initial and final (FIG. 3).

$$\frac{n_{1j} - n_{1i}}{n_{12} - n_{1i}} = \frac{N_1(j - 1) - N_{1i}}{N_{12} - N_{1i}}$$ (5)

$$\frac{n_{2j} - n_{2i}}{n_{22} - n_{2i}} = \frac{N_1(j - 1) - N_{1i}}{N_{22} - N_{1i}}$$ (6)

$$\frac{a_{2j} - a_{2i}}{a_{22} - a_{2i}} = \frac{N_1(j - 1) - N_{1i}}{N_{22} - N_{1i}}$$ (7)

In the expressions (5), (6) and (7) the parameters $N_1(j-1)$, $N_{1i}$, $N_{12}$ are the mechanical power losses of the $(j-1)$, i'th and first running-in cycles.

The value "j" varies from 2 to "i".

Let the mechanical power losses corresponding to the initial technical condition of the engine $N_{12}=K_1 \cdot a_{21}= =25$ hp.

If the end of the running-in is judged by Criterion One, i.e. variation of the mechanical power loss during the running-in process by 20 percent in relation to the mechanical power losses at the commencement of the running-in, then:

$$N_{1i}=0.8, N_{12}=20 \text{ hp}$$

According to expression (3):

$$n_{12} = 40(45 - 25) = 800 \text{ rpm} \quad (8)$$
$$n_{22} = 60(45 - 25) = 1200 \text{ rpm}$$
$$a_{22} = 1(45 - 25) = 20 \text{ rev/sec}^2$$

By substituting the initial conditions (8) and the final conditions (4) in expressions (5), (6) and (7) and by making the appropriate transformation, we have a law governing variation in the parameters of any intermediate j'th running-in cycle:

$$n_{1j} = 3000 - 440(N_{1(j-1)} - 20), \quad (9)$$
$$n_{2j} = 6000 - 960(N_{1(j-1)} - 20), \quad (10)$$
$$a_{1j} = 80 - 12(N_{1(j-1)} - 20), \quad (11)$$

In order to graphically depict variation in the running-in parameters with the mechanical power losses, we make up Table 1 by reference to equations (9), (10), with $N_{1(j-1)}$ varying from 25 hp to 20 hp.

TABLE 1

| $N_{1(j-1)}$ | 25 | 24 | 23 | 22 | 21 | 20 |
|---|---|---|---|---|---|---|
| $n_{1j}$ | 800 | 1240 | 1680 | 2120 | 2560 | 3000 |
| $n_{2j}$ | 1200 | 2160 | 3120 | 4080 | 5040 | 600 |
| $a_{1j}$ | 20 | 32 | 44 | 56 | 68 | 80 |

The graphs of equations (9), (10) and (11) constructed in accordance with Table 1 are shown in FIG. 3 where the running-in parameters $n_{2j}$, $n_{1j}$ and $a_{1j}$ are depicted as the equations of straight lines passing through the initial ($n_{12}$, $n_{22}$, $a_{12}$) and final ($n_{1i}$, $n_{2i}$, $a_{1i}$) points.

Figure 4:
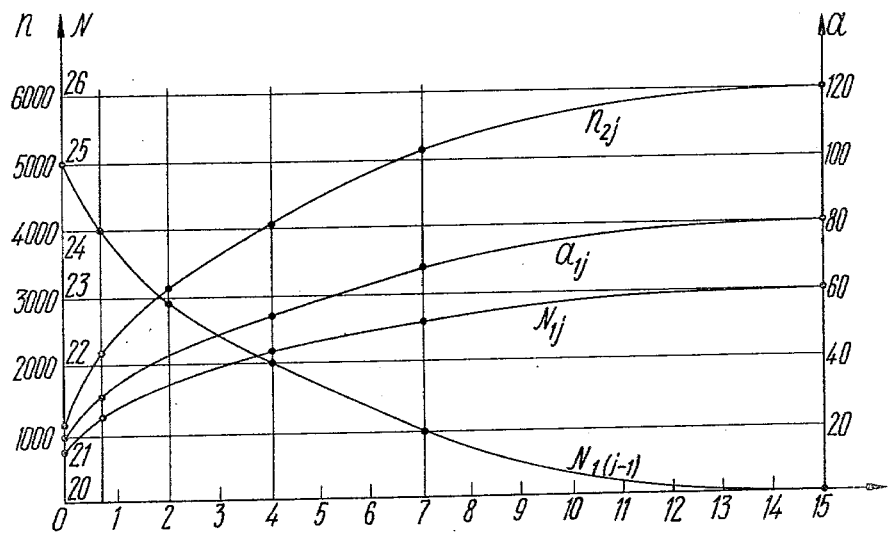
FIG. 4 is a graph depicting variation of the running-in parameters with time.

The graphs in FIG. 4 show variation of the running-in parameters $n_{2j}$, $n_{1j}$ and $a_{1j}$ according to the engine technical condition assessed by the mechanical power losses $N_{1(j-1)}$ varying with time.

It will be noted that in the process of running-in, practically in all engines most of the parameters determining the engine technical condition, for example, mechanical power losses at the commencement of the running-in, change rapidly and then stabilize with time, i.e. the variation law is exponential.

The computing device 5 (FIG. 1) makes all the calculations in accordance with equations (1), (3), (9), (10) and (11) and feeds them into the memory unit 8 which stores all the necessary data. The computing device 5 acts through the control unit 6 on the engine operational control system 9 which switches on the ignition when during the running-in process the engine speed drops down to the lower speed limit $n_{1j}$ and switches off the ignition when the engine speed reaches the upper limit $n_{2j}$.

Besides, during runup in each running-in cycle the engine operational control system 9 maintains the preset engine acceleration $a_{1j}$. The maintenance of the preset acceleration $a_{1j}$ is effected on the principle of comparing the value of $a_{1j}$ with the actual acceleration $a_{2j}$ at which the actuating mechanism of the system 9 must control the throttle opening in such a manner that the difference ($a_{1j} - a_{2j}$) tends to approach zero, i.e. the actual acceleration equals the preset acceleration.

The running-in parameters vary with the oil temperature $t_{1j}$ °C. in such a manner that when the temperature rises from 40° C. to 90° C. the coefficients $K_2$, $K_3$ and $K_4$ increase from zero to 20 percent. Equations (5), (6) and (7) are worked out to meet these variations, i.e. when the computing device 5 calculates the running-in parameters, it automatically corrects the coefficients $K_2$, $K_3$ and $K_4$ and makes the necessary calculations.

Increase in the coefficients $K_2$, $K_3$ and $K_4$ means that the graphs in FIGS. 2, 3 and 4 are raised, i.e. the engines are run in at higher rotational speeds and with a greater acceleration, i.e. under more strenuous conditions.

The running-in process is continued until the mechanical power losses $N_{11}$ in the i'th running-in cycle (FIG. 4) reach 20 hp according to the preset criterion at which point the ignition is switched off completely and the running-in process is ended.

The present invention can be used with particular advantage for running in spark-ignition engines, rather than compression-ignition (diesel) engines.

In the case of diesel engines it is necessary to have a complicated and yet quick-acting actuating mechanism for the purpose of maintaining the preset running-in parameters, for example, the lower rotational speed limit whereat the engine must be speeded up with the preset acceleration, and also the upper rotational speed limit whereat the engine must be switched over to rundown.

When reaching the limit rotational speeds, the actuating mechanism has to operate in an electromagnet mode in order to prevent the engine from exceeding the speed limits, whereas during runup the actuating mechanism has to maintain the preset runup acceleration.

Therefore, the system for running-in diesel engines according to the present invention is a complicated actuating mechanism having low dependability because of continuous operation in an electromagnet mode. When running-in spark-ignition engines, the preset rotational speed limits can be maintained by switching on and off the ignition, the throttle opening controlled by the actuating mechanism remaining nearly unchanged since during the running-in process the technical condition of the engine changes insignificantly from cycle to cycle.

Besides, in the case of spark-ignition engines the running-in parameters can be maintained more accurately because the ignition controlling system has a smaller time lag than an actuating mechanism operating in an electromagnet mode.

Thus, running in spark-ignition engines according to the present invention will be more accurate and more reliable.

What is claimed is:

1. A method for testing an engine comprising the steps of:

starting said engine;

controlling a fuel feed of said engine to obtain steady running at a first speed;

performing a first runup-rundown cycle consisting of accelerating said engine from said first speed to a second speed, and permitting said engine to decelerate to a third speed;

monitoring at least one parameter of said engine during said first runup-rundown cycle;

selecting parameters for a second runup-rundown cycle based on the monitored parameter during said first runup-rundown cycle;

performing said second runup-rundown cycle consisting of accelerating said engine from said third speed to a fourth speed and permitting said engine to decelerate to a fifth speed;

continuing the steps of monitoring, selecting and performing to produce subsequent runup-rundown cycles;

comparing a result of said monitoring with at least one standard parameter; and ending said testing when the result of said monitoring reaches a predetermined relationship with said standard parameter.

2. A method according to claim 1, wherein said at least one parameter includes an engine temperature.

3. A method according to claim 1, wherein said at least one parameter includes a deceleration.

4. A method according to claim 1, wherein said standard parameter includes a predetermined deceleration.

5. A method for testing an engine comprising the steps of:
alternately accelerating and decelerating said engine; and
monitoring said deceleration to determine a technical condition of said engine.

* * * * *